United States Patent
Wey et al.

(10) Patent No.: US 8,406,956 B2
(45) Date of Patent: Mar. 26, 2013

(54) DEVICE AND METHOD FOR CONTROLLING A STEERING SYSTEM IN A VEHICLE

(75) Inventors: Torsten Wey, Moers (DE); Joerg Hamel, Rheinland-Pfalz (DE); Frank Peter Engels, Solingen (DE); Jens Domhege, Pulheim (DE)

(73) Assignee: Ford Global Technologies, Dearborn, MI (US)

( * ) Notice: Subject to any disclaimer, the term of this patent is extended or adjusted under 35 U.S.C. 154(b) by 469 days.

(21) Appl. No.: 12/706,684

(22) Filed: Feb. 16, 2010

(65) Prior Publication Data

US 2010/0211264 A1  Aug. 19, 2010

(30) Foreign Application Priority Data

Feb. 16, 2009  (DE) .......................... 10 2009 000 868

(51) Int. Cl.
*G05D 1/00* (2006.01)
*B62D 5/04* (2006.01)

(52) U.S. Cl. .......................................... 701/41; 180/443

(58) Field of Classification Search .................... 701/41, 701/42; 180/444, 400, 442, 443, 446, 412, 180/6.28, 413, 415, 421, 422, 423
See application file for complete search history.

(56) References Cited

U.S. PATENT DOCUMENTS

| | | |
|---|---|---|
| 2002/0129988 A1* | 9/2002 | Stout et al. ..................... 180/400 |
| 2009/0024281 A1* | 1/2009 | Hwang ........................... 701/42 |

* cited by examiner

*Primary Examiner* — Mary Cheung
*Assistant Examiner* — Muhammad Shafi
(74) *Attorney, Agent, or Firm* — Angela M. Brunetti; Raymond Coppiellie (57) ABSTRACT

A method for controlling a vehicle steering system having a plurality of subsystems that generate steering requests for the steering system comprising the steps of receiving a plurality of steering requests at an electronic control unit, receiving a plurality of vehicle parameter signals at the electronic control unit, the vehicle parameter signals being representative of a driving situation for each subsystem in the plurality of subsystems, setting an order of priority for application of the steering requests by the electronic control unit as a function of the driving situation for each subsystem, and controlling the application of the steering requests to the vehicle steering system in the set order of priority and within a predetermined overall torque limit.

22 Claims, 8 Drawing Sheets

System already active, 300

| Permission to activate \ Requesting System | DSR | LDW | LKA | NDA | PDC | SAPP | TSC |
|---|---|---|---|---|---|---|---|
| DSR |  | Accept/decline | Accept/decline | Accept/decline | Accept/decline | Accept/decline | Accept/decline |
| LDW | Accept/decline |  | Accept/decline | Accept/decline | Accept/decline | Accept/decline | Accept/decline |
| LKA | Accept/decline | Accept/decline |  | Accept/decline | Accept/decline | Accept/decline | Accept/decline |
| NDA | Accept/decline | Accept/decline | Accept/decline |  | Accept/decline | Accept/decline | Accept/decline |
| PDC | Accept/decline | Accept/decline | Accept/decline | Accept/decline |  | Accept/decline | Accept/decline |
| SAPP | Accept/decline | Accept/decline | Accept/decline | Accept/decline | Accept/decline |  | Accept/decline |

FIG. 6

Newly active system, 350

| Continue if activate \ Already active system | DSR | LDW | LKA | NDA | PDC | SAPP | TSC |
|---|---|---|---|---|---|---|---|
| DSR |  | Continue/deactivate | Continue/deactivate | Continue/deactivate | Continue/deactivate | Continue/deactivate | Continue/deactivate |
| LDW | Continue/deactivate |  | Continue/deactivate | Continue/deactivate | Continue/deactivate | Continue/deactivate | Continue/deactivate |
| LKA | Continue/deactivate | Continue/deactivate |  | Continue/deactivate | Continue/deactivate | Continue/deactivate | Continue/deactivate |
| NDA | Continue/deactivate | Continue/deactivate | Continue/deactivate |  | Continue/deactivate | Continue/deactivate | Continue/deactivate |
| PDC | Continue/deactivate | Continue/deactivate | Continue/deactivate | Continue/deactivate |  | Continue/deactivate | Continue/deactivate |
| SAPP | Continue/deactivate | Continue/deactivate | Continue/deactivate | Continue/deactivate | Continue/deactivate |  | Continue/deactivate |
| TSC | Continue/deactivate | Continue/deactivate | Continue/deactivate | Continue/deactivate | Continue/deactivate | Continue/deactivate |  |

352 — Overall torque limit exceeded

DEVICE AND METHOD FOR CONTROLLING A STEERING SYSTEM IN A VEHICLE

CROSS REFERENCE

This application is a continuation of foreign filed application DE 102009000868.3 filed Feb. 16, 2009, whose subject matter is incorporated herein by reference and provides the basis for a claim of priority of invention under 35 U.S.C. §119.

TECHNICAL FIELD

The inventive subject matter relates to a device and a method for controlling a steering system in a vehicle.

BACKGROUND

Driving assistance systems and active safety systems that are being designed for the future must be capable of influencing the steering system by means of an electronic controller. Degrees of freedom in the steering system generally comprise the steering position (angular position of the wheels) and the steering sensation (manual/steering wheel torque). The two degrees of freedom may each be controlled by suitable actuators, generally referred to as electronically controllable control system (ECS). Examples of ECS systems in which the steering position can be controlled independently of driver inputs are Active Front Steering (AFS) systems, rear axle steering (RAS) systems, and steer-by-wire systems in which steering commands are passed on to an actuator exclusively by electronic means.

If a driver does not exert any influence on the lateral behavior of the vehicle, that is to say he removes his hands from the steering wheel, steering position control may be carried out by means of additional steering systems in which the steering torque is controlled, such as for example in an electric power assisted steering (EPAS) system. EPAS systems or combinations, such as the combination of an AFS/steer-by-wire system with an EPAS system, are capable of carrying out a steering sensation/torque control process. In this case, the driver also applies a certain steering torque, which has to be taken into account in the control architecture. Furthermore, an electro-hydraulically assisted steering (EHPAS) system can assist the steering torque, but this usually takes place in a control range which is restricted compared to the EPAS system.

In the future development of vehicles, it will be necessary to cover different steering functionalities simultaneously, even under circumstances in which the control loops for the steering position and the steering torque issue commands simultaneously.

Each individual system checks its activation with respect to specific driving states and/or driver inputs. However, a particular problem arises when the systems request activation simultaneously. Furthermore, although each individual system monitors the angle request or torque request which is generated by the respective system, the resulting overall value for the angle or torque may exceed a specific limiting value which is predefined by the controllability on the part of the driver. Incorrect arbitration and limitation may give rise to uncomfortable steering behavior, and in the worst case, may even bring about a situation in which an average driver may lose control over the steering system.

Known approaches to a solution include a Multi-Input Multi-Output (MIMO) concept in which a plurality of control loops are coupled to one another and are controlled by a central controller. Therefore, different functionalities may be controlled by such a concept given the maximum functionality of the individual systems. In the case of simultaneous activation of the systems, it may be possible for disadvantages to occur, such as during the management of simultaneous requests to a steering system. It may be that non-linearities are not all covered by the MIMO concept. Additionally, the establishment of a central MIMO controller increases the adjustment complexity considerably. If a system is added or removed, the entire MIMO controller must be readjusted. Furthermore, the robustness of a central MIMO controller, with respect to variation of the parameters, for example due to the aging process, is less than it would be for a case in which there are several control loops with a single output.

There is a need for a device and method for controlling a steering system in a vehicle for which different requests to the steering system may be reconciled with one another as a function of a state of the vehicle and a current driving style.

SUMMARY

The present invention is a device for controlling a steering system in a vehicle, in which the steering system has a plurality of subsystems which are each configured to direct at least one steering request to the steering system. The device has an arbitration and limitation logic by which steering requests directed to the steering system are prioritized as a function of a driving situation of different subsystems, and possibly coinciding steering requests are suppressed in such a way that a predefined overall level of the steering torque which is applied by the steering system is not exceeded. Examples of a driving situation include but are not limited to braking, acceleration (positive or negative), lateral acceleration, oversteer, understeer, parking, vehicle speed, forward or reverse driving, hands on/off the steering wheel, interaction with infrastructure and/or other vehicles (e.g., overtaking lane departure . . . ).

According to the present invention, different requests to the steering system are subjected to arbitration or prioritization in order to reconcile the steering functions with one another as a function of the state of the vehicle and a current driving style. Furthermore, according to the invention, a restriction to a degree or level of steering intervention which can be controlled or handled by the driver is carried out. The restriction is applied, if appropriate, for coinciding requests which are limited to an overall acceptable level with respect to a minimum adverse effect on the functionality in order to ensure the functional reliability in all driving situations.

Preferably, the arbitration and limitation logic is implemented inside an electronic control unit (ECU) of the ECS system, since external requests have to be reconciled with internal steering functions to generate a typical steering sensation. However, as an alternative, it is possible to use other control modules without departing from the scope of the invention.

The present invention is advantageous because it makes available an arbitration and limitation logic that is independent of a mathematical description of the subsystem and functions which output the respective steering requests. The logic of the present invention is easily implemented and adjusted in accordance with the functional requests. The modular design of the present invention provides robustness with respect to parameter variations. The modular design of the centralized arbitration and limitation logic of the present invention makes possible a combination of a plurality of driving assistance functions and/or safety functions in which the driver does not depart from a range of controllability in all driving situations.

The arbitration and limitation logic of the present invention is initially defined at the signal level of the actuator and in the case of an EPAS system, this is carried out on the basis of a torque which is applied by an electric motor. For this purpose, requests on an angle basis are converted into requests on a torque basis in a control loop which is particularly provided for this purpose, before the arbitration and limitation processes are carried out. In contrast, for the case of an angle-based actuator, such as in an AFS system, the arbitration and limitation logic is carried out on an angle basis, with the result that the other requests by the logic are firstly correspondingly converted.

Further refinements may be found in the description and the appended claims.

DESCRIPTION OF DRAWINGS

FIG. 5 is a table of an arbitration rule base used in the method of the present invention;

FIG. 6 is a table of a deactivation rule base used in the method of the present invention;

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter.

Figure 1:
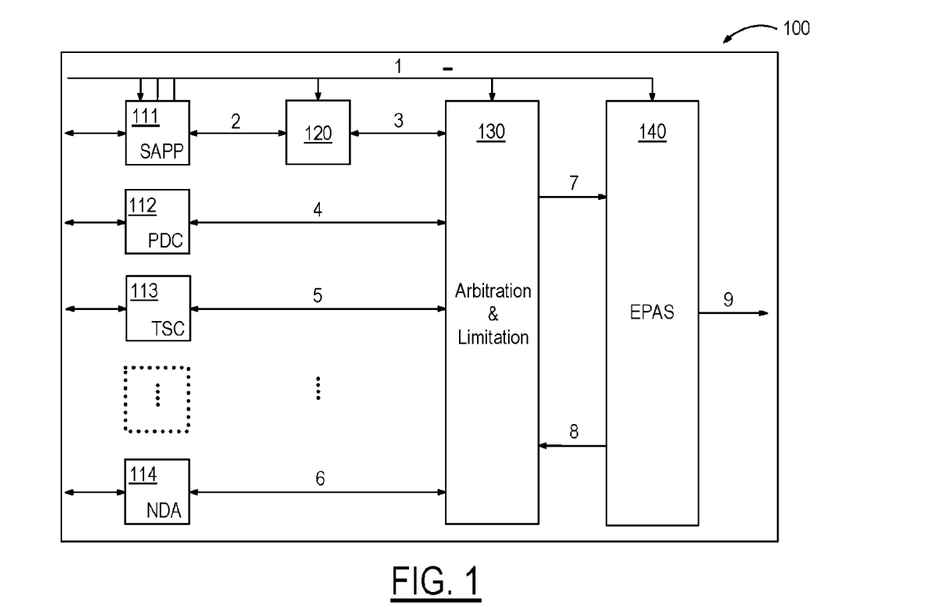
FIG. 1 is a schematic diagram of the arbitration and limitation logic in accordance with a method of the present invention.

FIG. 1 is a schematic diagram of the arbitration and limitation logic in accordance with a method 100 of the present invention. Arbitration and limitation logic 130 is integrated between a plurality of subsystems, 111, 112, 113, 114 and a torque controller 140 such as is used in an EPAS system. The plurality of subsystems 111-114 may include, but are not limited to, a semi-automatic parallel parking (SAPP) system 111, a pull-drift compensation (PDC) system 112, a torque-steer compensation (TCS) system 113, and a nibble detection algorithm (NDA) 114. Other examples of subsystems, not shown but which may be included without departing from the scope of the present invention, are a driver steer recommendation (DSR) system and a lane departure warning (LDW) system.

The arbitration and limitation logic 130 performs, in particular, the following tasks:

makes a decision about system interventions as a function of a driving situation;

makes a decision about the priority of a predetermined subsystem;

activates/deactivates each subsystem in a manner which is optimum for all driving situations through communication with the subsystems in order to exchange a respective status processes subsystem requests from different areas such as steering angle, steering wheel torque and steering parameter change requests;

gently and/or gradually transitions between the subsystems;

ensures that limits of controllability by the driver are not exceeded in all driving situations;

senses situations in which the driver releases the steering wheel;

minimizes adjustment complexity; and coordinates subsystems which analyze the same vehicle signals in such a way that the activation of a subsystem does not lead to an adverse effect on the results of another subsystem.

A driving situation may include, but is not limited to, an event such as braking, accelerating (positive and negative), lateral acceleration, oversteer and understeer conditions, parking, vehicle speed, forward or backward driving, hands on or hands off the steering wheel, interaction with infrastructure and/or other vehicles (e.g., cut-in, lane departure, passing). Vehicle parameters that are monitored by the vehicle subsystems are used to indicate a particular driving situation. For example, a vehicle speed situation or a braking situation may be identified by a vehicle speed provided by a brake control module may be transmitted by way of CAN to the logic module 130. Another example may be the steering angular rate as provided to the logic module 130 by a power steering control module may be used to identify a hands-on or hands-off the steering wheel driving situation. In yet another example, a signal indicating a reverse driving situation may be provided to logic module 130. Still another example may be signals from an environment sensing system that is part of an automatic parking sensor may be used as an input to the logic module 130. One skilled in the art will recognize that any signal that may be made available, either via CAN bus or directly from a vehicle system such as the steering gear, may be used by the logic module to alter priorities and set limits for the application of steering requests.

Figure 2:
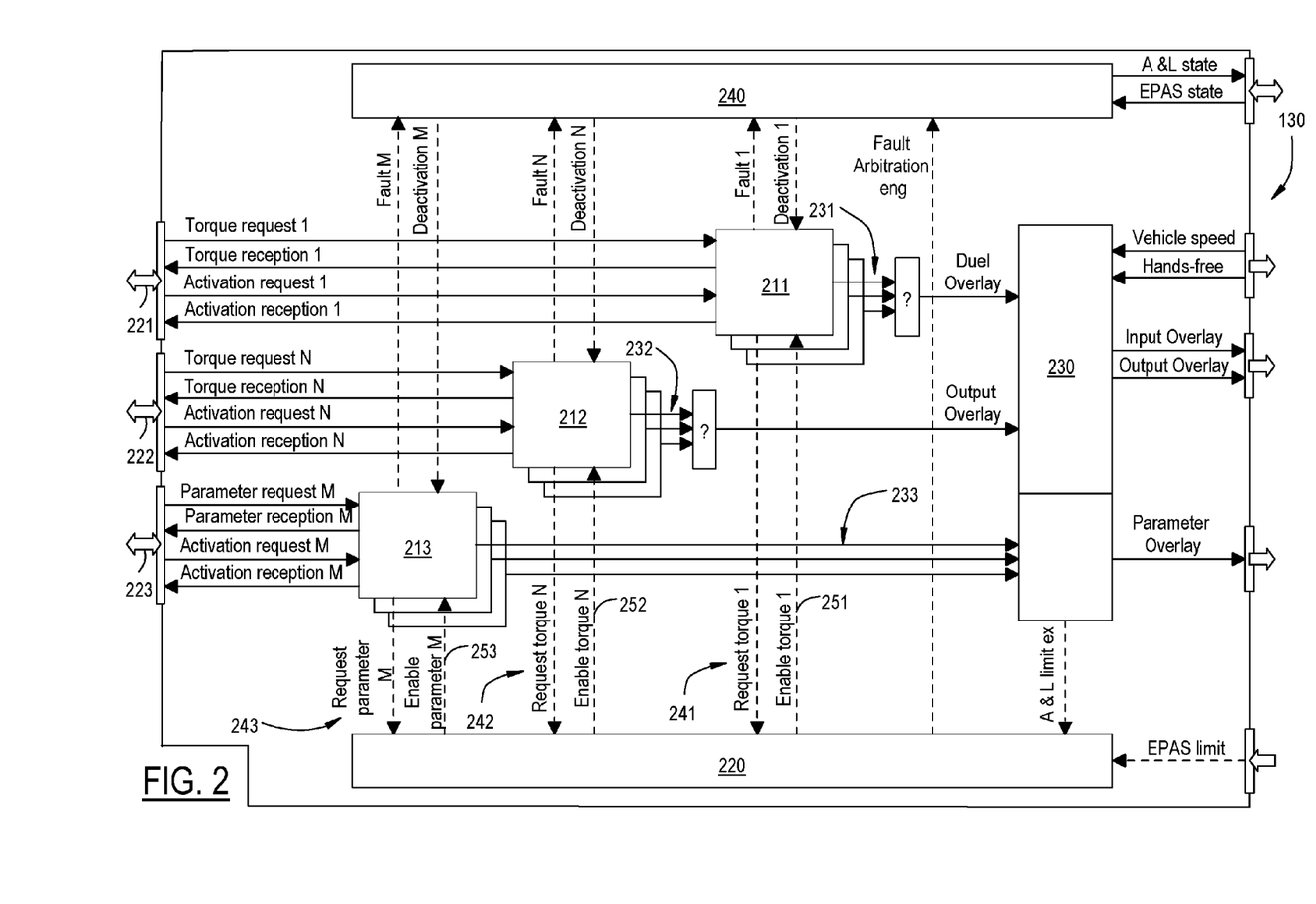
FIG. 2 is a block diagram of the modular design of the arbitration and limitation logic of the present invention.

Referring now to FIG. 2, there is shown a block diagram of the modular design of the arbitration and limitation logic 130 of the present invention. The logic includes the following function modules: a gateway and limitation module 211, 212, 213 for each subsystem, an arbitration device module 220, an overall torque limiter module 230, and a mode and fault handler module 240. It should be noted that for example purposes, a limited number of gateway modules are shown in FIG. 2. However, one skilled in the art is capable of increasing and/or decreasing the number of subsystems that may be implemented in the method according to the present invention. Gateway and limiter modules 211, 212, 213, which are assigned to a respective subsystem, receive requests 221, 222, 223 from the relevant subsystem (not shown in FIG. 2). The gateway and limiter modules 211, 212, 213 output a response 231, 232, 233 with a respective status information item, and, if necessary, limit output values to predefined ranges. At the same time, the respective gateway and limitation module 211, 212, 213, communicates a status 241, 242, 243 of the respective subsystem to a central arbitration unit 220 and receives an activation/deactivation 251, 252, 253 decision from the central arbitration unit 220. The gateway and limiter modules 211, 212, 213 are arranged in parallel in order to take into account different input signal levels of the EPAS, such as, for example, a steering wheel torque basis. A further signal stream in the gateway and limiter modules assists direct changing of steering system parameters. Necessary steering angle changes are processed in a closed control loop before arbitration and limitation processes take place, where a torque request is supplied to the gateway and limiter module 211, 212, 213. Further subsystems may be integrated into this design without appreciable expenditure on adjustment.

Figure 3:
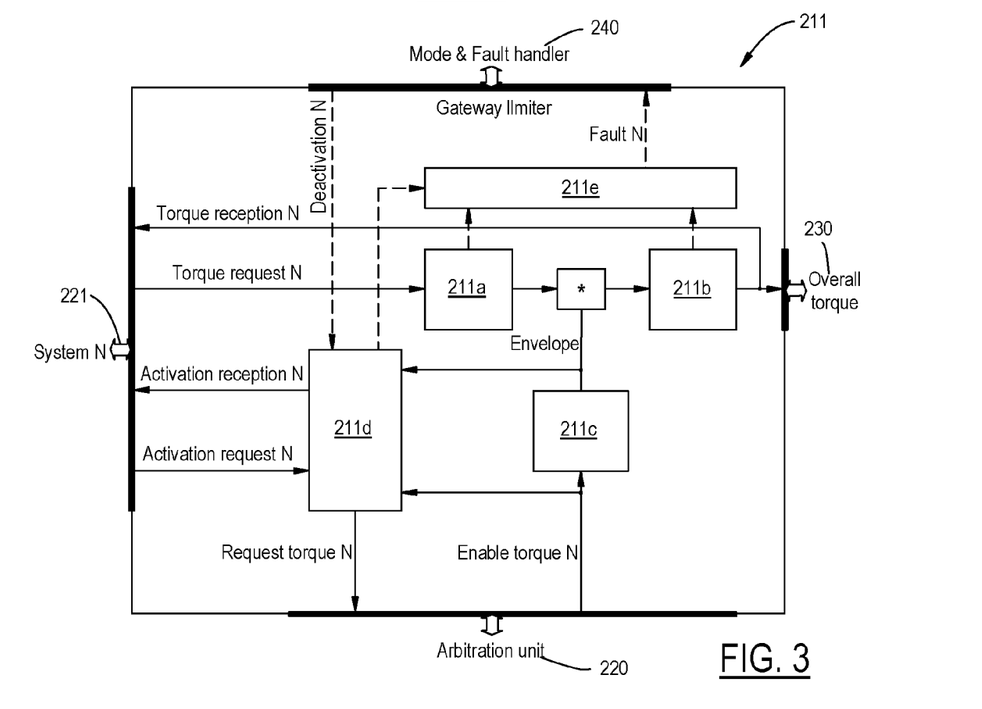
FIG. 3 is a block diagram of a gateway and limiter module of the present invention.

In the following description, particular reference is made to the specific case of an EPAS actuator and is exemplary of each gateway and limiter module that may be implemented in the method of the present invention. FIG. 3 is a block diagram of a gateway and limiter module 211 which has modules, 211a and 211b, for limiting both the absolute value and the rate of a request (for example, limiting torque value and limiting value rate). A further fade-in/out module 211c carries out monitoring for transition processes. Signal exchange with the system is carried out by way of a communication module 211e whereby messages relating to the torque rate or torque limiting value faults are collected.

Figure 4:
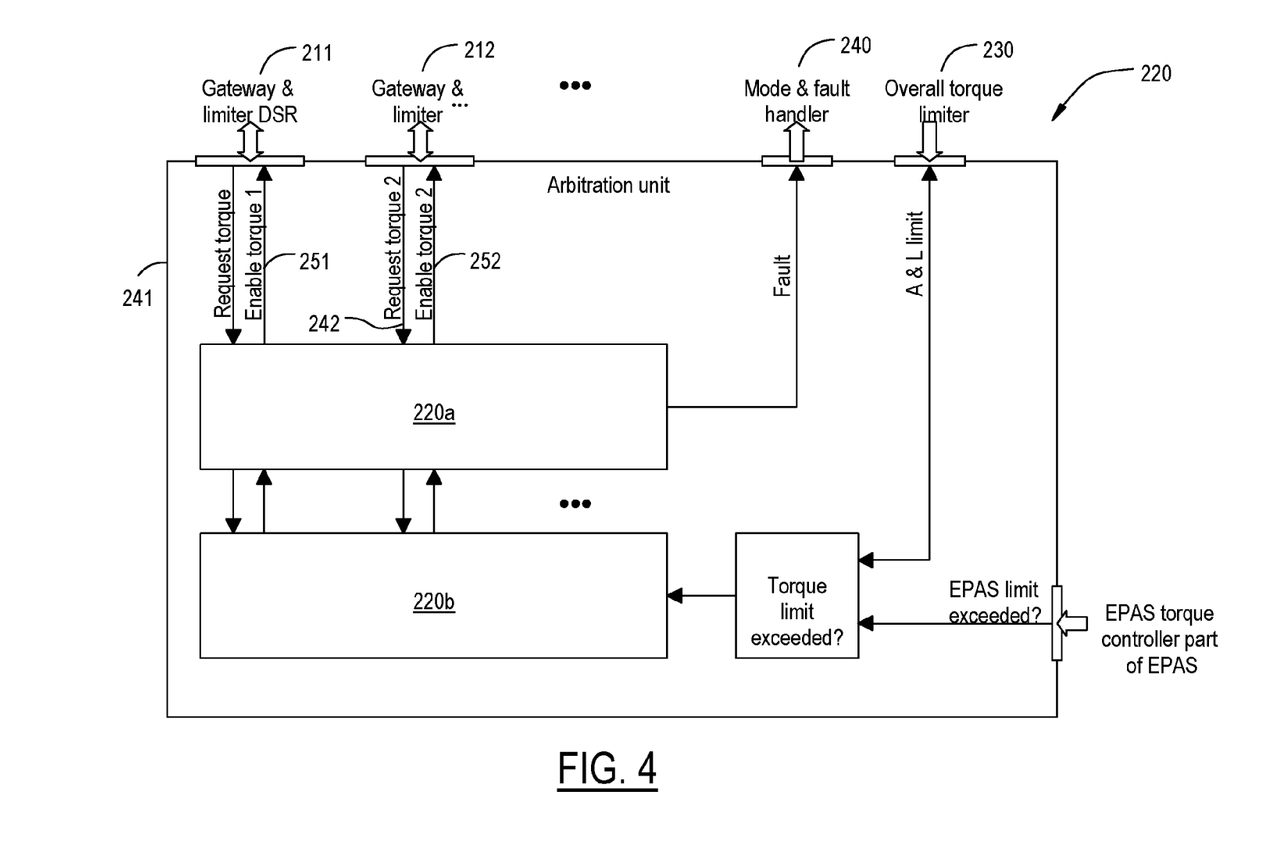
FIG. 4 is a block diagram of an arbitration module used in the present invention.

FIG. 4 is a block diagram of the arbitration unit 220 of the arbitration and limitation module 130. The arbitration unit 220 has an arbitration rule base 220a which makes decisions about system interventions and prioritizations, and a separate deactivation rule base 220b for correctly deactivating systems and a fault memory. Upon the aborting of a request that is the result of a controllable range being exceeded, the deactivation rule base 220b returns the steering system gently and/or gradually to a valid state without the driver being confused by this action. A torque limit comparison is applied to the deactivation rule base 220b and will be discussed in detail later in the disclosure.

FIG. 5 is a two-dimensional matrix or table 300 of the arbitration rule base 220a that defines the reaction of the arbitration and limiter module to system requests. Depending on the current state (active or inactive) of the systems, this two-dimensional matrix contains the information as to whether a request is to be accepted or declined. If a number of subsystems are already activated, a "decline" field in a line is already sufficient to reject a request. The matrix values are subjected to an adjustment and are dependent upon possible interventions of other subsystems.

FIG. 6 is a table 350 of a deactivation rule base 220b used in the method of the present invention. A suitable deactivation routine is necessary for a satisfactory intervention of the subsystems. This is achieved in a similar way as in the case of the arbitration rule base 220a. A check is made as to whether a new active subsystem, which is enabled by the arbitration rule base, requires an already active subsystem to be deactivated. According to the table shown in FIG. 6, the deactivation rule base 220b has "continuation" and "deactivation" commands which are output as a function of the current system status. Furthermore, a "limit exceeded" signal 352 from the overall torque limiter (not shown in FIG. 6) causes a subsystem to be deactivated in the order predefined by the priorities. Both the content of the table and the priority list for the subsystems are subject to an adjustment.

Figure 7:
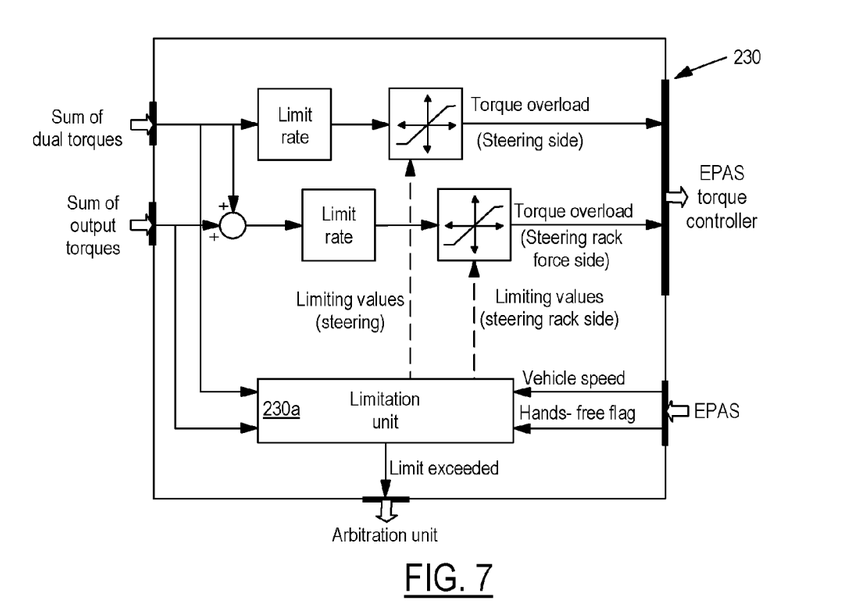
FIG. 7 is a block diagram of an overall torque limiter used in the method of the present invention.

FIG. 7 is a block diagram of the overall torque limiter 230 used in the method of the present invention. According to FIG. 7, the overall torque limiter 230 has a central limitation unit 230a which reads in the requested torques, or the requested steering rack forces, the current vehicle speed, and a confirmation signal for release of the steering wheel. On the basis of this information, the central limitation unit 230a dynamically limits the maximum permitted values on the two request channels to a desired range. Furthermore, the limitation unit 230a monitors the situation for the case in which a limiting value has been reached and the signal throughput goes into a saturated state.

Figure 8:
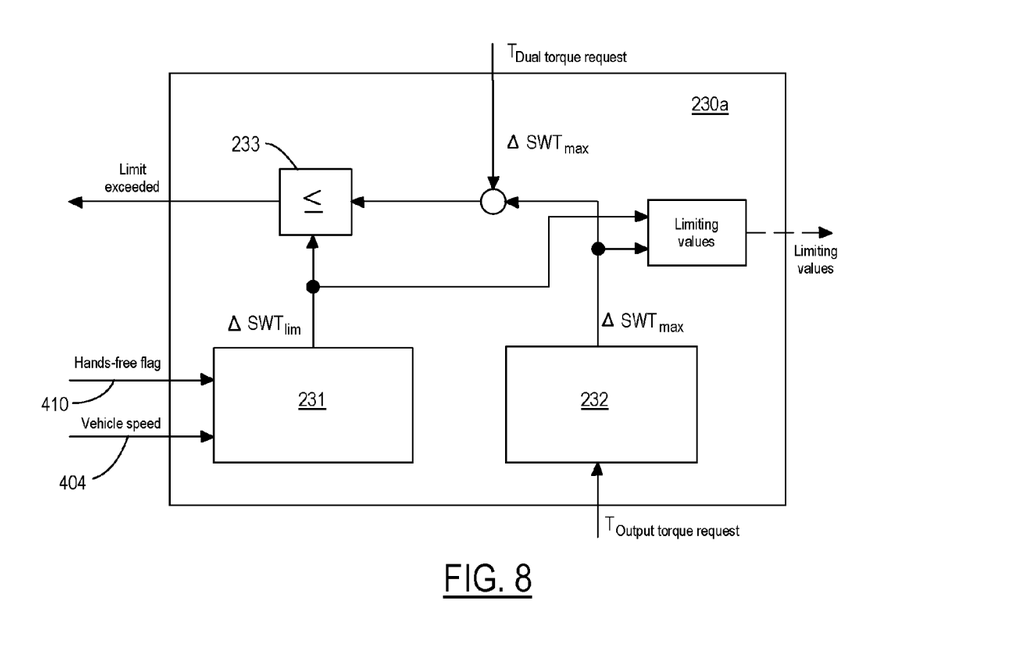
FIG. 8 is a block diagram of a central limitation module in the overall torque limiter used in the method of the present invention.
Figure 9:
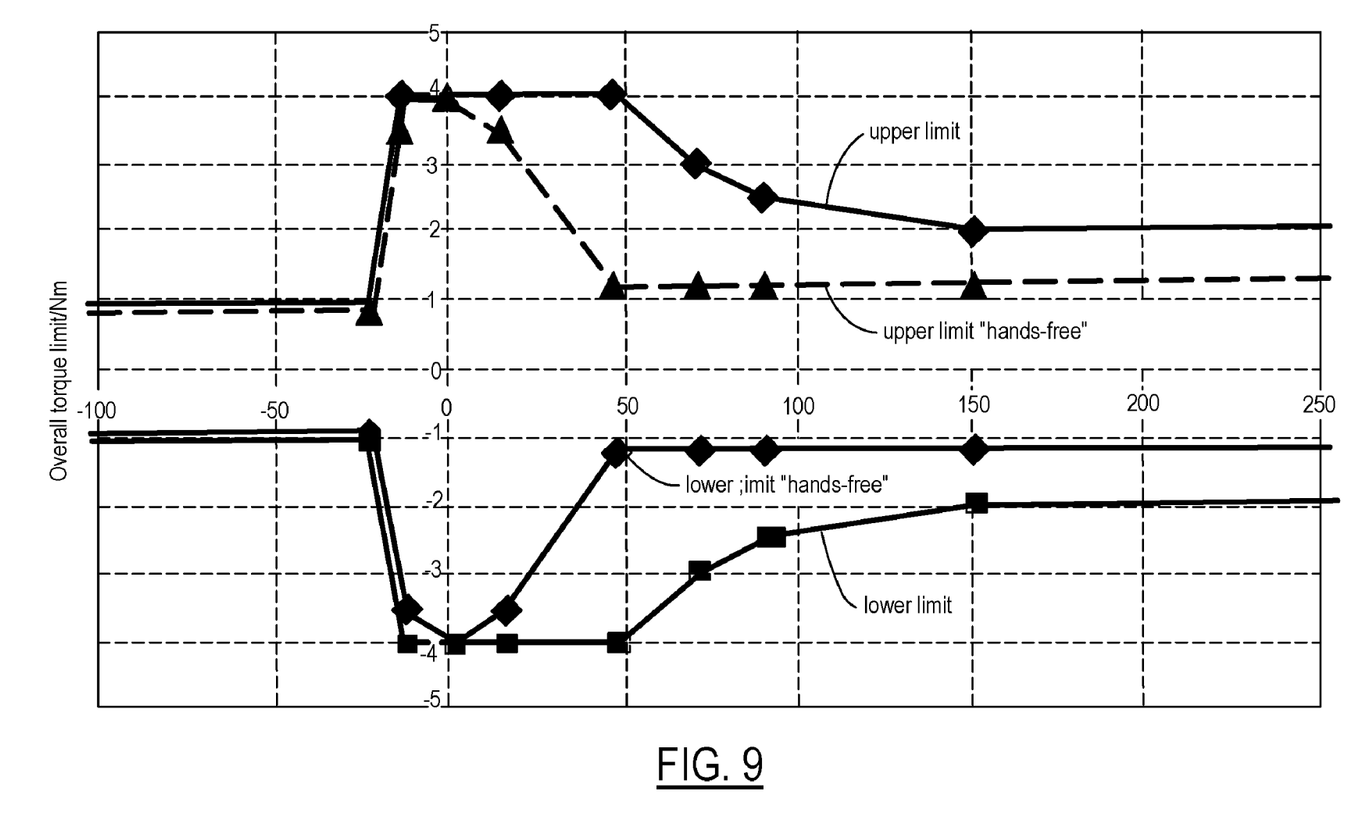
FIG. 9 is a graph.

FIG. 8 is a block diagram of the central limitation module 230a in the overall torque limiter used in the method of the present invention. According to FIG. 8, the central limitation unit 230a has a limiting value table module 231 that defines a maximum permissible steering torque, $\Delta SWT_{lim}$ as a function of the ramp, signal shape, frequency and vehicle speed 404 and the state (yaw rate, longitudinal acceleration and steering torque request) in relation to possible release of the steering wheel indicated by a hands-free flag signal 410. The limiting value table module 231 may be implemented as a lookup table. A further method for calculating the limiting value may be to observer the request over a defined period of time in order to take into account the controllability. See FIG. 9 which shows curves are defined both for the maximum permissible torque and the minimum permissible torque. Additionally, reduced limiting values may be used for situations with a released (hands-free) steering wheel. Switching between the limiting values depends upon input signals. A gentle transition may be ensured by means of a transition between the curves. Depending on the systems being considered, the torque limiting values may also be defined for negative vehicle speeds.

Referring back to FIG. 8, steering rack force requests, $T_{Output\ torque\ request}$, need to be converted into a steering torque. This is accomplished in an equivalent steering torque module 232. A sum of the requested steering torques from module 232 is compared with the current limiting value, $\Delta SWT_{lim}$, defined in module 231. The comparison is carried out by module 233, as a less than/equivalent comparison. Whenever the currently valid limiting value is exceeded, a corresponding "limit exceeded" flag is set.

A standard boost approach for implementing the steering may be applied as an indirect relationship between the steering wheel torque, $T_{sw}$, and a requested steering rack force, or the output torque as shown in Equation 1:

$$T_{sw}+f(T_{sw})=T_{Output\ Torque\ Request} \quad (1)$$

Figure 10:
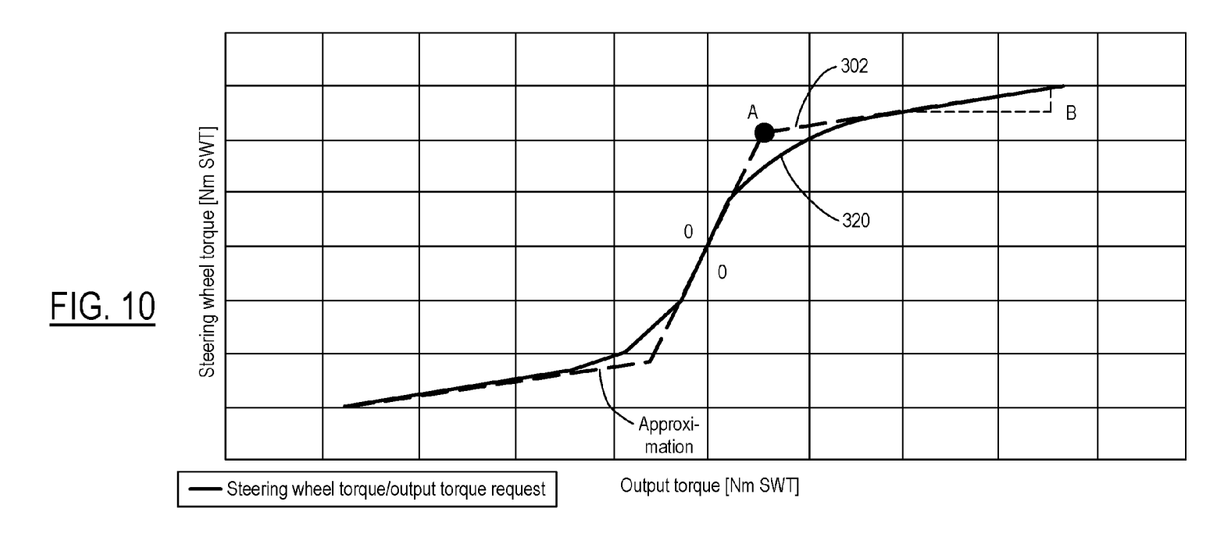
FIG. 10 is a graph.

The function, f, is typically defined as a lookup table, with the result that an explicit evaluation of $T_{sw}$ does not take place directly as a function of the requested output torque. An inverse lookup table is used for the evaluation and may be determined offline. FIG. 10 is a graph showing a general form of an inverse boost curve, 320, for a single value of the vehicle speed. Because the boost curve 320 generally depends greatly on the vehicle speed, the inverse table will need to be defined for all possible vehicle speeds. This also applies to additional driving state signals.

In order to significantly reduce the amount of storage space that is required, it may be possible to use an approximate description of the inverse boost curve. An approximation curve 302 is shown in FIG. 10 for which a complete definition requires only an x-y coordinate (A) and a gradient value (B) for the vehicle speed because the curve is symmetrical with respect to the value of the output torque. The approximation curve 302, which is based on tangential values when x=0 and x=∞, is always greater than or equal to an original inverse value. For safety aspects, this limitation is more restrictive than necessary.

Figure 11:
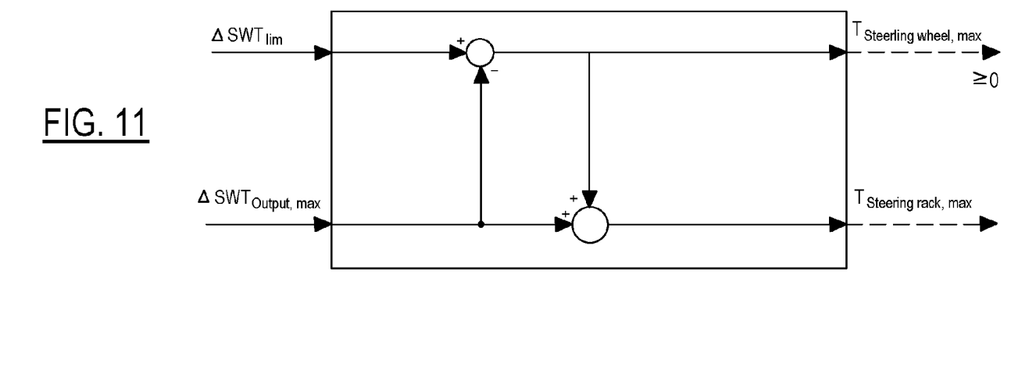
FIG. 11 is a detailed block diagram representation of the limiting values module that was first introduced in FIG. 8.

FIG. 11 is a more detailed representation of the limiting values block that was first introduced in FIG. 8. Referring to FIG. 11, the output torque request, $\Delta SWT_{lim}$ and the maximum permitted steering wheel torque, $\Delta SWT_{Output, max}$ are converted into two separate values for the torque limits. A first torque limit is for the steering torque, $T_{Steering\ Wheel, max}$ and the second torque limit is for the steering rack force, $T_{Steering\ Rack, max}$. The structure of this particular signal stream shown that any steering rack force request has a torque on the steering wheel side.

Referring again to FIG. 8, a state relating to a possible release of the steering wheel is sensed and signaled, see hands-free flag, to the overall torque limiter 230. When driving with a released steering wheel any request of a driving assistance system or a safety system with respect to the steering torque may bring about a lateral deviation of the vehicle from an original route which may be greater than anticipated. As a result, for situations with a released steering wheel, the overall torque limiter 230 has a different limitation curve than the one discussed in FIG. 11.

Figure 12:
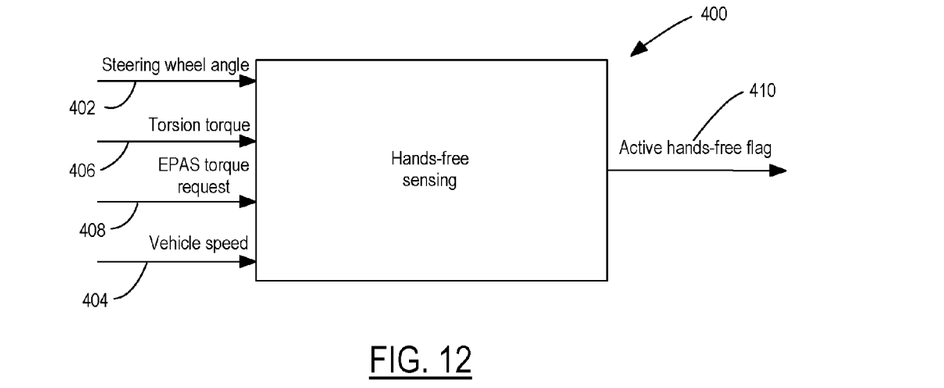
FIG. 12 is a block diagram representation of hand-free sensing module.

FIG. 12 is the module 400 relating to active sensing of situations with a released steering wheel that provides the hands-free flag 410 (also shown in FIG. 8). Referring to FIG. 12, the function in Figure may use a steering wheel angle 402, a vehicle speed 404, a torsion torque 406 and the torque 408 requested by the overall torque limiter as particular sensor signals. The module for active sensing of situations in which the steering wheel is released is intended to promote a high degree of availability of functions for the driver. For this reason, a flag 410 for "released steering wheel" is output as "true" only if the driver does not have his hands on the steering wheel and a lateral deviation is caused by a system request. For implementation, the active sensing module monitors steering wheel speed and steering wheel acceleration, which are both derived from the steering wheel angle and the torsion torque. The module checks for the presence of the following situations of respective system requests:

system request is present;
vehicle speed is within a specific range;
a high steering wheel acceleration and a low torsion torque occur in a direction opposite that of a steering wheel acceleration; and
the steering wheel angle is within a predetermined range of a center position.

This module 400 is based on a physical background. A driver introduces a certain degree of damping and inertia into the steering system with respect to the generated steering angle. Therefore, situations where a steering wheel is being held tight and situations where a steering wheel is released may be described by differential equations having their own, significantly different, parameter groups. The following Equation (2) describes the steering angle generated for a simplified situation of a steering system which acts from a center position counter to a steering rack force (described in model terms as a spring) and without friction influences:

$$T_{Driver} + \Theta \ddot{\delta}_{Steer} + d\dot{\delta}_{Steer} + c\delta_{Steer} = iT_{Motor}$$

with $$T_{Driver} = \begin{cases} \Theta_{DriverSteer} + d_{DriverSteer} \end{cases} \quad (2)$$

The differentiation between a state with a steering wheel which is being held tight and a state with a steering wheel which is released can consequently be made on the basis of the different steering wheel angle reactions and torsion torque reactions to a change in motor torque. For specific driving assistance systems or safety systems, the motor torque request can exceed a predefined torque limiting value without the corresponding critical steering wheel torque actually being generated. An example is a relatively high frequency harmonic torque request, in which case the inertia influences and damping influences on the steering system have the effect of a low-pass filter for the generated steering wheel torque. In this case, the overall torque limiter 230 should be updated in such a way that the amplitudes of the harmonic signal are not unnecessarily restricted.

Figure 13:
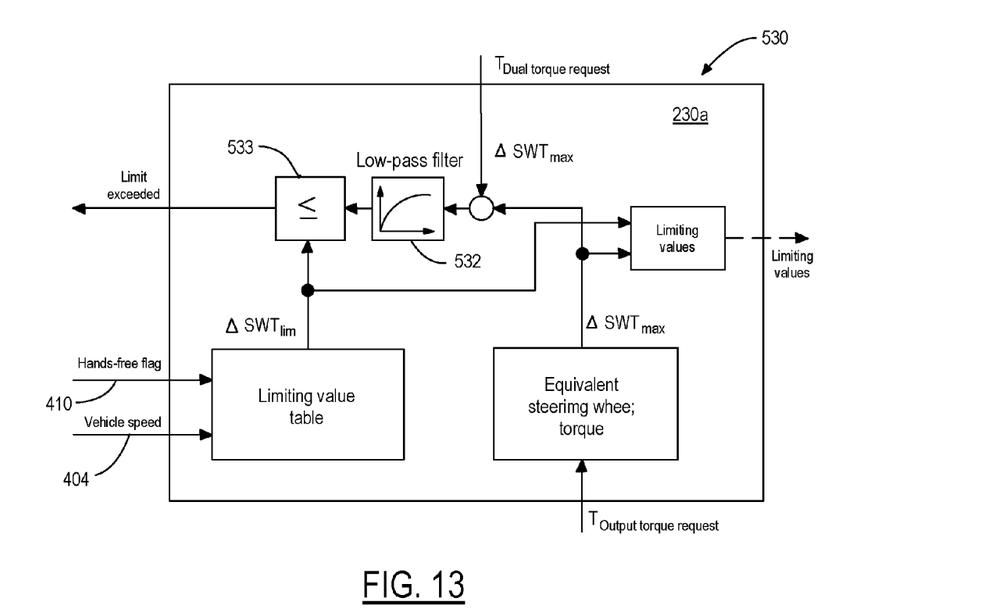
FIG. 13 is a block diagram of another embodiment of the gateway and limiter module according to the present invention.

FIG. 13 is another embodiment of the overall torque limiter 530 of the present invention in which a maximum value of the equivalent steering wheel torque request is passed through a low pass filter 532 before being compared 533 with the current limiting value $\Delta SWT_{lim}$.

The method of the present invention controls a steering system in a vehicle by means of reconciling different requests to the steering system with one another. The requests are reconciled as a function of the state of the vehicle and the current driving situation. The different requests to the steering system are subjected to prioritization by arbitration logic. The requests are restricted by a degree or level of steering intervention, which can be controlled or handled by the driver. If appropriate, coinciding requests are limited to an overall acceptable level to have a minimum adverse effect on the steering functionality. This ensures the steering function remains reliable for all driving situations.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method for controlling a vehicle steering system having a plurality of subsystems that generate steering requests for the steering system, the method comprising the steps of:
    receiving a plurality of steering requests at an electronic control unit;
    receiving a plurality of vehicle parameter signals at the electronic control unit, the vehicle parameter signals being representative of a driving situation for each subsystem in the plurality of subsystems;
    setting an order of priority for application of the steering requests by the electronic control unit as a function of the driving situation for each subsystem; and
    controlling the application of the steering requests to the vehicle steering system in the set order of priority and within a predetermined overall torque limit.

2. The method as claimed in claim 1 wherein steering requests comprise requests to change a steering angle, a steering wheel torque and a steering parameter.

3. The method as claimed in claim 1 wherein the step of setting an order of priority further comprises:
    activating or deactivating a subsystem; and
    communicating the activation of deactivation of the subsystem to the electronic control unit.

4. The method as claimed in claim 3 wherein the step of deactivating a subsystem further comprises the steps of:
    deactivating the subsystem in response a steering request that would exceed the predetermined overall torque limit; and
    controlling the steering system to maintain the predetermined overall torque limit.

5. The method as claimed in claim 3 wherein the step of activating or deactivating a subsystem further comprises referring to a look-up table having a predetermined decision for activating or deactivating a subsystem based on possible subsystem combinations.

6. The method as claimed in claim 5 wherein the step of deactivating a subsystem further comprises the step of applying a continuation or deactivation command to at least one subsystem based on a current system status.

7. The method as claimed in claim 6 wherein the step of applying a continuation or deactivation command further comprises referring to a look-up table having a predetermined decision for continuing or deactivating a subsystem based on possible subsystem combinations and the predetermined overall torque limit.

8. The method as claimed in claim 1 wherein the step of controlling the application of the steering requests to the vehicle steering system in the set order of priority and within a predetermined overall torque limit further comprises the steps of:
    setting a hands-free steering wheel status; and
    defining the predetermined overall torque limit as a function of a ramp, signal shape, frequency, vehicle speed and state of a driving situation with respect to the hands-free steering wheel status.

9. The method as claimed in claim 8 wherein the step of setting a hands-free steering wheel status further comprises the step of using a plurality of sensor signals to actively sense a hands-free steering wheel status.

10. The method as claimed in claim 9 wherein the step of using a plurality of sensor signals further comprises using a steering wheel angle, a vehicle speed, torsion torque and a predetermined torque request.

11. The method as claimed in claim 10 wherein the step of setting a hands-free steering wheel status further comprises the steps of:
    confirming the presence of a predetermined torque request;
    confirming the vehicle speed is within a predetermined range;
    confirming the occurrence of a high steering wheel acceleration and a low torsion torque in a direction opposite that of the steering wheel acceleration;
    confirming the occurrence of a high steering wheel speed and a low torsion torque in a direction opposite that of the steering wheel speed;
    confirming a steering wheel angle that is within a predetermined range of a center position; and
    analyzing the confirmed occurrences to determine whether a steering wheel status is hands-free.

12. The method as claimed in claim 11 wherein the step of setting a hands-free steering wheel status further comprises setting a flag when the analysis of confirmed occurrences indicates a hands-free status and a lateral deviation of the vehicle is sensed in response to application of the predetermined torque request.

13. The method as claimed in claim 12 wherein the step of defining the predetermined overall torque limit further comprises the step of referring to a look-up table for a respective predetermined overall torque limit that is to be applied depending on whether the hands-free steering wheel status flag is set.

14. A vehicle steering control system comprising:
    an electronic control unit (ECU) configured to receive steering requests and at least one signal representative of a driving situation from a plurality of subsystems;
    a predetermined overall torque limit for steering requests; and
    a modular logic unit in the ECU having a plurality of modules configured to arbitrate, prioritize and apply the steering requests in response to the driving situation and within a predetermined overall torque limit.

15. The system as claimed in claim 14 wherein the modular logic unit further comprises a gateway and limitation module for each subsystem in the plurality of subsystems, wherein the gateway and limitation modules are arranged in parallel.

16. The system as claimed in claim 15 wherein the gateway and limitation module further comprises:
    a module for limiting steering requests from a respective subsystem;
    a module for monitoring application of steering requests;
    a module for communicating with the plurality of subsystems; and
    a module for collecting fault messages relating to steering requests.

17. The system as claimed in claim 16 wherein the module for limiting steering requests further comprises a module for receiving a limiting value torque and a module for receiving a limiting value rate.

18. The system as claimed in claim 16 wherein the modular logic unit further comprises an arbitration module for applying a rule base to activate or deactivate a subsystem and controlling the steering system to maintain the predetermined overall torque limit.

19. The system as claimed in claim 18 wherein the arbitration module further comprises a look-up table.

20. The system as claimed in claim 16 wherein the modular logic unit further comprises an overall torque limiter module for receiving steering requests, confirming a hands-free steering wheel status, and dynamically limiting the application of steering requests to maintain steering torque within the predetermined overall torque limit.

21. The system as claimed in claim 20 wherein the overall torque limiter module further comprises a look-up table.

22. The system as claimed in claim 20 wherein the overall torque limiter module further comprises a low-pass filter having a time-constant that is configured to represent a dynamic behavior of the steering system.

* * * * *